United States Patent [19]

Freeman et al.

[11] Patent Number: 5,677,434

[45] Date of Patent: Oct. 14, 1997

[54] IRON-COMPLEXED FORMAZAN DYES FOR POLYAMIDE AND PROTEIN SUBSTRATES

[75] Inventors: Harold S. Freeman; Jolanta Sokolowska-Gajda, both of Raleigh, N.C.; Abraham Reife, Toms River, N.J.

[73] Assignee: North Carolina State University, Raleigh, N.C.

[21] Appl. No.: 656,638

[22] Filed: May 31, 1996

[51] Int. Cl.$^6$ .................. C09B 56/10; C09B 62/018; C09B 62/038

[52] U.S. Cl. ............................... 534/652; 534/618

[58] Field of Search ....................... 534/652, 618

[56] References Cited

U.S. PATENT DOCUMENTS

| | | | |
|---|---|---|---|
| 3,497,493 | 2/1970 | Grosemann | 534/652 X |
| 5,376,151 | 12/1994 | Freeman et al. | 8/685 |

OTHER PUBLICATIONS

Sokolowska–Gajda, Dyes and Pigments, vol. 30, No. 1, pp. 1–20 (1996).

Sokolowska–Gajda, Textile Research Journal, vol. 64, No. 7, Jul. 1994, pp. 388–396.

Kubicki, Chemical Abstracts, vol. 71, p. 76 (1969) Abstract No. 14161f Polish No. 55361.

Kubicki, Chemical Abstracts, vol. 71, p. 76 (1969) Abstract No. 14162g Polish 55362.

Kubicki, Chemical Abstracts, vol. 71, p. 76 (1969) Abstract No. 14163h Polish 56636.

Jankowski et al., Chemical Abstracts, vol. 100, pp. 85–86 (1984) Abstract No. 105087v Polish 116084.

Bialkowski et al., Chemical Abstracts, vol. 104, (1986) Abstract No. 90917x Polish 1242566.

Cieslak, Chemical Abstracts, vol. 112, p. 151 (1990) Abstract No. 160–998r Polish 146991.

Primary Examiner—Floyd D. Higel
Attorney, Agent, or Firm—Wenderoth, Lind & Ponack

[57] ABSTRACT

A family of 1:2 Fe-complexed formazan dyes is described. The dyes unexpectedly afford reddish-violet, violet, blue and black shades on natural and synthetic substrates. Methods for synthesizing the dyes and for dyeing a substrate are described. The dyes represent environmentally friendly alternatives to conventional Cr- and Co-based azo and formazan dyes.

12 Claims, No Drawings

IRON-COMPLEXED FORMAZAN DYES FOR POLYAMIDE AND PROTEIN SUBSTRATES

STATEMENT OF GOVERNMENT SUPPORT

The present invention was made in part with Government support under Grant No. 99-27-07400, which was awarded by the U.S. Department of Commerce. The Government has certain rights in the invention.

TECHNICAL FIELD

The present invention relates in general to fast metallized acid dyestuffs and to methods for making such dyestuffs. More particularly, the invention relates to dyeings on natural substrates, such as wool, leather and silk, and on synthetic substrates, such as nylon.

BACKGROUND OF THE INVENTION

The present invention is concerned with "environmentally friendly" alternatives to dyeings containing a priority pollutant metal ions, especially Co(III), Cr(III) and Cu(II) ions. The presence of these metals in dye wastewater has become the subject of considerable concern in the textile and associated industries. By "environmentally friendly" it is meant that the dyes, the methods of making the dyes, the dyes in dyed substrates, and the processes used in dyeing substrates do not produce wastewater effluents having a high level of metal cations regarded by the U.S. Environmental Protection Agency as being priority pollutants.

In addition to environmental considerations, among the most important properties considered when determining the suitability of dyestuffs for textile application are lightfastness, washfastness and crockfastness. Since many synthetic dyes tend to undergo photodegradation upon exposure to light, especially UV light, resulting in fading of the dyed textile fibers, an improvement in dye lightfastness is often achieved by metallization of suitable dyes to form 1:1 or 1:2 metal complexes, e.g., with metals such as Co, Cr and Cu [P. F. Gordon and P. Gregory, "Metal Complexed Azo Dyes", in *Organic Chemistry in Color*, 116–121 (1983)]. Each of these metals, however, is considered a "priority pollutant" [*NIOSH Pocket Guide to Chemical Hazards*, NIOSH Publication No. 90-117, 1990] meaning that they pose a significant risk to human health and the environment and that their concentrations in effluents must not exceed rather stringent levels. The washfastness of dyes for protein and polyamide substrates is also important, particularly on wool employed in milling operations where the dyed substrate is subjected to rigorous washings [E. R. Trotman, *The Dyeing and Chemical Technology of Textile Fibres*, (1975)]. Crockfastness (resistance to color transfer by rubbing) is a particularly important property for upholstery substrates (fabric and leather).

Although metal complexes of dyes containing Fe, a relatively environmentally innocuous metal, have been proposed in the patent literature, they are not often used in the coloration of textile fibers. This perhaps can be traced to the general belief that Fe-complexed azo dyes are inferior to Cr and Co-complexed azo dyes in both fastness and brightness [M. L. Crossley, *American Dyestuff Reporter*, Sep. 4, 1939, p. 487; H. A. Lubs, *The Chemistry of Synthetic Dyes and Pigments*, "Azo Dyes: Chrome Dyes", 153, (1956)]. Consequently, Fe complexes have not generally been considered to be viable alternatives. This may be because the early complexes made were actually 1:1-complexed azo dyes, as disclosed in U.S. Pat. No. 2,499,133, rather than 1:2 Fe-complexed structures. Moreover, Fe-complexed azo dyes usually produce olive-brown and brown shades, making their applicability somewhat limited. It is well known that Fe-complexed dyes have almost always been developed for the coloration of leather in brown shades. The exception is a group of 1:2 Fe-complexed azo dyes giving lightfast black shades on wool, as disclosed in U.S. Pat. No. 5,376,151 (issued to Freeman et al.).

Various unmetallized dyes have been previously investigated, and formazan compounds have been used in a number of areas. For instance, because formazans produce very fast and intense color reactions with different metal ions, they are often used as analytical reagents. Since water-soluble, colorless tetrazolium salts can be reduced to water-insoluble, deeply colored formazans, they have found practical application as bioindicators in biochemistry and cytochemistry. Also, the conversion of tetrazolium salts into metallized formazan dyes is known in the area of color photography.

By far, the most important commercial formazan dyes are 1:1 Cu-complexed reactive blue formazan dyes suitable for dyeing and printing cellulose fibers. The biggest group of these dyes contains a chlorotriazine reactive group [JP 1-161,063; JP 63-225,662; JP 60-90,264; JP 60-226,559; JP 60-258,266; DE 3,840,653; GB 315,045; GB 315,046; GB 333,656] or a fluorotriazine group [GB 228,348; DE 3,743, 236]. Some of the reactive formazan dyes (1:1 Cu complexes) contain a 5-chloro-2,4,6-trifluoropyrimidine group [DE 3,239,364; DE 3,406,232; DE 4,005,122; GB 338,310] as the reactive system. DE 4,005,122 also proposes the use of Fe as the metal used for metallizing cellulose-reactive dyes. A significant number of reactive formazan dyes (1:1 Cu complexes) contain a vinyl sulfone or related group [DE 3,326,638; DE 3,413,315; DE 3,440,265; DE 3,843,135; U.S. Pat. No. 4,607,098] sometimes also in combination with a chlorotriazine group, thereby giving bifunctional reactive dyes [GB 410,930; GB 410,931].

The patent literature also contains examples of 1:1 Cu or Ni-complexed formazan disperse dyes for dyeing polyamide fibers [U.S. Pat. Nos. 3,592,584; 3,663,525; and 3,655,637] and water-soluble cationic metal-complexed formazan dyes for dyeing polyacrylonitrile fibers [U.S. Pat. No. 3,497,493]. The latter patent also proposes using Fe as a metal for dye metallization, although the resulting dyes are quite different structurally from those of the present invention, in that they are 1:1 metal-complexed cationic dyes.

The patent literature [e.g., Polish Pat. 55,361; 55,362; 56,636; 116,084] contains a few examples of 1:2 metallized formazan dyes. However, all of these dyes are 1:2 Co-complexed formazan compounds and are used for dyeing protein and polyamide fibers from neutral or weakly acidic baths. They can be used separately [Polish Pat. 124,566] or in combination [Polish Pat. 146,991] with other dyes and are recommended for dyeing leather.

Co-complexed formazan complexes containing sulfonamide, alkylsulfonyl or sulfonic acid groups possess high affinity for protein and polyamide fibers, and have high coloring strength and good fastness properties, making them useful as dyes for textile materials. However, in addition to the adverse environmental impact of this type of dye, the range of colors provided is small. An exemplary Co-complexed formazan dye is Acid Black 180, which has the structure shown in formula (I):

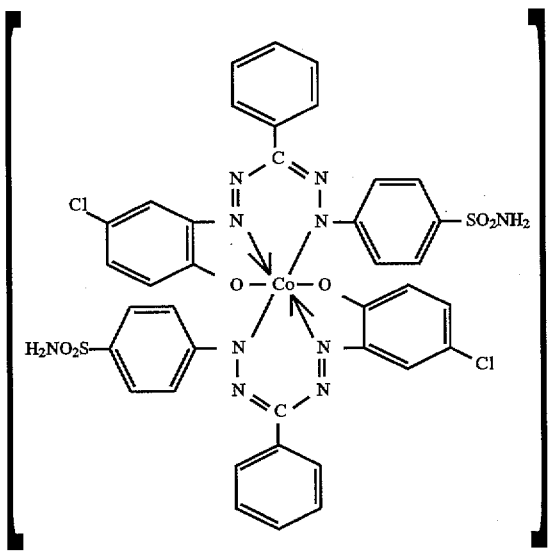

(I)

In view of the above considerations, it is desired to develop Fe-based dyes that afford colors other than the blacks or browns of previous Fe-based dyes. Such Fe-based dyes preferably have fastness properties equal or superior to those of dyes containing a priority pollutant metal, such as those in current use. The availability of such Fe-based dyes would represent a significant advance in the development of environmentally friendly commercial dyes.

SUMMARY OF THE INVENTION

The present invention is for a 1:2 Fe-complexed formazan dye for use in dyeing natural and synthetic substrates. A dye of the present invention can be used for dyeing protein and polyamide fibers, i.e., natural and synthetic fibers. Representative fibers include nylon, wool, silk or leather. The dyeings obtained are distinguished by their strength of color and by their very good fastness, particularly lightfastness, washfastness and crockfastness.

Dyed substrates and an associated method of dyeing the substrate with an instant dye are also a part of the invention.

Another aspect of the present invention is for a method of making an instant dye. This method entails diazotizing a 2-aminophenol or 2-aminobenzoic acid compound and reacting the diazonium salt with a benzaldehyde phenylhydrazone to give an unmetallized formazan dye. This dye is then metallized with an Fe salt to form the 1:2 Fe formazan dye.

The formazan dye molecules form 1:2 complexes with Fe(II) and Fe(III) in aqueous solution to give atypical colors for Fe-complexed dyes, i.e., the metallized dyes so produced unexpectedly give blue, violet, reddish-violet, and black colorants for protein and polyamide substrates, in addition to the traditionally reported brown colorants.

The present invention represents a departure from conventional approaches to protecting the environment through the use of wastewater treatment to remove toxic metals resulting from the pervasive presence of Co- and Cr-based metallized dyes, in that the present approach is based on pollution prevention through the replacement of certain Co- and Cr- based dyes with environmentally friendly, inexpensive, and technically viable 1:2 Fe-complexed formazan dyes.

The present invention will now be described in more detail by referring to specific examples, which clarify but do not limit the invention.

DETAILED DESCRIPTION OF THE INVENTION

The present invention is for a 1:2 Fe-complexed formazan dye for use in dyeing natural and synthetic substrates. Previous 1:2 metal complexed formazan dyes have not incorporated Fe atoms into metallized complexes. The substitution of Fe atoms for priority pollutant metals in a metallized dye of the invention affords an environmentally friendly dye having good fastness properties.

A 1:2 Fe-complexed formazan dye of the present invention can be represented generally by the following formula (II):

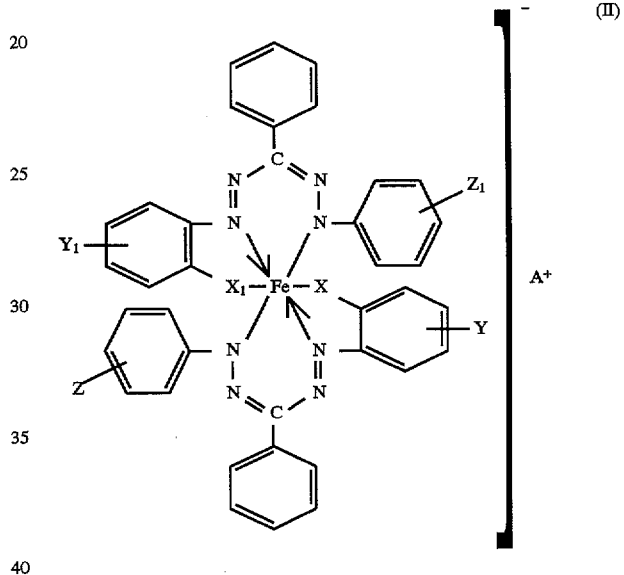

In formula (II), X and $X_1$ are independently O or COO;

Y and $Y_1$ are independently H, halogen such as Cl or Br, $NO_2$, $SO_2NH_2$, $SO_2N(R_1)_2$, $SO_2NH(R_1)$, or $SO_2(R_1)_2$, where $R_1$ is $C_1$–$C_6$ alkyl, $C_1$–$C_6$ hydroxyalkyl, or $C_1$–$C_6$ alkoxyalkyl;

Z and $Z_1$ are independently H, $SO_2NH_2$, $SO_2N(R_1)_2$, $SO_2NH(R_1)$, or $SO_2(R_1)_2$ (where $R_1$ is $C_1$–$C_6$ alkyl, $C_1$–$C_6$ hydroxyalkyl, or $C_1$–$C_6$ alkoxyalkyl), or $SO_3M$ (where M is $H^+$, a metal ion, such as $Na^+$, $K^+$, or $Li^+$, or $NH_4^+$); and $A^+$ is $H^+$, a metal ion, such as $Na^+$, $K^+$, or $Li^+$, or $NH_4^+$. Typically, $A^+$ and M are identical in a dye.

Preferably, whenever Y and/or $Y_1$ is halogen, the halogen is Cl. In the formulas for the above-listed sulfonamido groups, $R_1$ is preferably selected from methyl, ethyl, propyl, butyl, amyl, or hexyl. When Z and/or $Z_1$ is $SO_3M$, M is preferably $Na^+$, $K^+$, $Li^+$, or $NH_4^+$.

In a preferred embodiment of the invention, a dye has the formula (III) as follows:

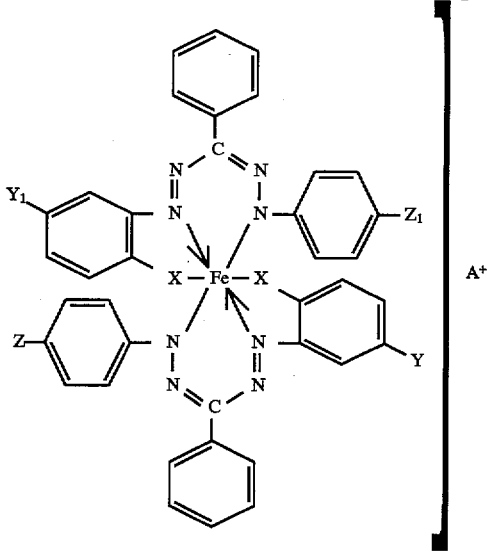

(III)

wherein X, $X_1$, Y, $Y_1$, Z, $Z_1$ and $A^+$ have the same meanings as defined for formula (II) hereinabove. That is, as shown in formula (III), Y, $Y_1$, Z and $Z_1$ are located in the 4- (para) position on their respective rings.

Also contemplated is a substrate, such a proteinaceous or polyamide fabric, which has been dyed with an instant dye. Preferred substrates include synthetic substrates, such as Nylon 6 and Nylon 66, and natural substrates, such as wool, silk, or leather. Such a dyed substrate preferably has a lightfastness comparable to that of C.I. Acid Black 52, C.I. Acid Black 172, C.I. Acid Black 107, or C.I. Acid Black 63.

Preferably, an instant 1:2 Fe formazan complex is dyed at a depth of up to 10% dye based on the weight of the substrate. More preferably, the dye is dyed at a depth of up to 6% based on the weight of the substrate.

Another aspect of the present invention is for a method of making an instant dye. Accordingly, a dye may be prepared by:

1) diazotizing a substituted or unsubstituted 2-aminophenol or 2-aminobenzoic acid compound (when substituted, the substituent is represented by Y or $Y_1$ in the formulas herein);

2) reacting the resulting diazonium salt with a substituted or unsubstituted benzaldehyde phenylhydrazone having formula (IV), to give an unmetallized formazan dye

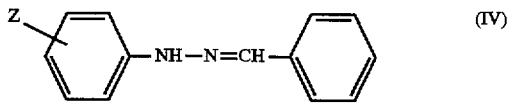

(IV)

(where Z has the same meaning as given above);

3) converting the unmetallized formazan dye to a 1:2 Fe:formazan complex by combining the unmetallized dye with an Fe salt at a pH of about 8 or less; and 4) precipitating (salting out) the metallized dye.

Thus, an instant formazan system is prepared by coupling a diazotized o-hydroxy or o-carboxy substituted aniline with a substituted or unsubstituted benzaldehyde phenylhydrazone in an alkaline medium, possibly in the presence of organic solvent.

Preferably, the 2-aminophenol or 2-aminobenzoic acid has the formula (V),

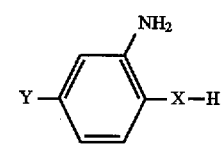

(V)

where X is O or COO, and Y is as defined above.

Benzaldehyde phenylhydrazone-4-sulfonamide or benzaldehyde phenylhydrazone-4-sulfonic acid [Fierz-David, H. et al., "Fundamental Processes of Dye Chemistry", Interscience, 1949, pp. 128–129] were prepared by condensing benzaldehyde with phenylhydrazine-4-sulfonamide or phenylhydrazine-4-sulfonic acid as described hereinbelow.

In a preferred aspect, the Z substituent in formula (IV) is located at the 4-position on the phenylhydrazone ring.

In another aspect of the invention, unsymmetrical 1:2 Fe formazan dyes, i.e., in which two different dye molecules bond to a common Fe atom, are prepared. These unsymmetrical 1:2 Fe complexes are of o,o'-bis(hydroxy)-substituted formazan dyes, o,o'-bis(carboxy)-substituted formazan dyes, and o-(hydroxy)-o'-(carboxy)-substituted formazan dyes. They are formed by admixing at least two different symmetrical dyes, which produces a statistical mixture of unsymmetrical and symmetrical dyes.

In a method of making an instant Fe-complexed formazan dye, various Fe salts may be used, at a pH of about 8 or less, the pH being chosen so as to avoid the formation of iron hydroxide. Preferred salts are iron sulfates, iron nitrates, iron halides, iron formates, iron acetates, and combinations thereof. Most preferred salts are Fe(II) and Fe(III) sulfates.

As an example, an instant method for preparing a 1:2 Fe-complexed formazan dye comprises diazotization of 2-amino-4-nitrophenol or 2-amino-4-chlorophenol followed by coupling with benzaldehyde phenylhydrazone-4-sulfonamide to produce an unmetallized formazan dye. The unmetallized formazan dye is then converted to a 1:2 Fe-complex using Fe(II) sulfate or Fe(III) sulfate in the presence of NaOH (pH=7.5–8.0).

Once the metallized formazan dye has been prepared it can be precipitated by combining it with a source of $A^+$ ions, where $A^+$ is $H^+$, a metal ion such as $K^+$, $Na^+$, or $Li^+$, or $NH_4^+$. The resulting product has the formula (II) or (III) as presented hereinbefore.

Using the methods described above and in further detail below, two of the instant 1:2 Fe formazan dye complexes, designated below as dye 103 and dye 113, were synthesized and evaluated as automotive dyes [J. E. Bullock et al. "Colorfastness Correlation of Accelerated Aging Methods for Automotive Interior Trim", *J. Ind. Fabrics*, 4(2): 23–32 (1985)].

For comparison, laboratory synthesized samples of dye (VI) were prepared for subsequent incorporation of Cr to produce the commercially significant dye C.I. Acid Black 172, which is the 1:2 Cr complex thereof.

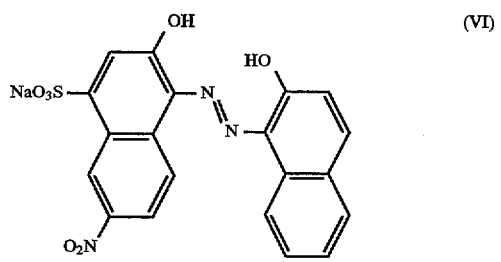

(VI)

Dye (VI) was prepared by diazotizing 1-amino-2-naphthol-4-sulfonic acid with sodium nitrite in the presence of copper sulfate, followed by nitration with mixed acid and coupling to 2-naphthol [I.G. Farbenindustrie, PB74760, frame 9600; see, H.A. Lubs, ibid.].

Nylon fabric was dyed at 100° C. for 1 hour using an Ahiba Texomat dyeing machine and a dyebath containing 2–6% (owf) (owf=on weight of fiber) dye, 3% ammonium acetate (owf), and a 40:1 liquor ratio. Wool fabric was dyed at 100° C. for 45 minutes using an Ahiba Texomat dyeing machine and a dyebath containing 2–6% (owf), 4% ammonium sulfate, and a 40:1 liquor ratio. The resulting dyed textiles were rinsed with warm and cold water and air-dried. The washfastness and crockfastness of the dyed textiles were evaluated using standard methods [cf. "Technical Manual of the American Association of Textile Chemists and Colorists", Vol 67 AATCC (1992)].

When a black dyeing is produced using the Fe-complexed formazans of this invention, the depth of dye in the dyed substrate should be up to about 8%, and most preferably the depth of dye in the dyed substrate should be about 6%. The substrate may be selected from natural substrates such as wool, silk, and leather or from synthetic substrates such as nylon.

Preferably, a dye of the invention has formula (II) or (III) as indicated hereinabove. Generally, whenever Y and/or $Y_1$ represent strong electron-withdrawing substituents, such as $NO_2$, the dye is black in color. Representative black dyes are 103 and 113 as described hereinafter. On the other hand, whenever Y and/or $Y_1$ represent H and Cl, the dyes are typically blue in color, such as blue dyes 101 and 105 described hereinafter.

Thus, in a preferred embodiment, an Fe-complexed formazan dye comprises a black 1:2 Fe-complexed formazan dye as in formulas (II) or (III) above, wherein X and $X_1$ are O, Y and $Y_1$ are $NO_2$, Z and $Z_1$ are $SO_2NH_2$, and A is Na. Alternatively, an Fe-complexed formazan dye can comprise a blue 1:2 Fe-complexed formazan dye as in formulas (II) or (III) above, wherein X and $X_1$ are O, Y and $Y_1$ are H or Cl, Z and $Z_1$ are $SO_2NH_2$, and A is Na.

An instant black 1:2 Fe-complexed formazan dye has superior lightfastness in the dyeing of textiles, which is comparable to that of Acid Black 172, a 1:2 Cr-complexed azo dye having the formula (VII) shown below:

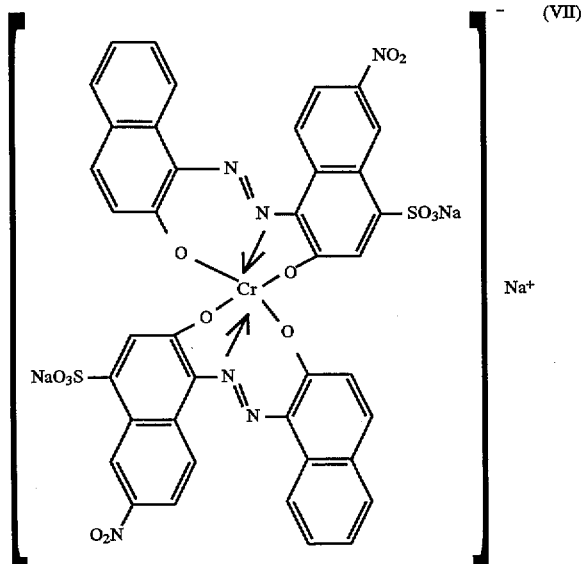

Also, in accordance with a preferred embodiment of the invention, a dyed textile is black when dyed with a black colored dye comprising a 1:2 Fe-complexed formazan dye having formula (II) or (III), wherein X and $X_1$ are O, Y and $Y_1$ are $NO_2$, Z and $Z_1$ are $SO_2NH_2$, and A is Na. Also, a dyed textile is blue when dyed with a blue colored dye comprising a 1:2 Fe-complexed formazan dye having formula (II) or (III), wherein X and $X_1$ are O; Y and $Y_1$ are H or Cl; Z and $Z_1$ are $SO_2NH_2$; and A is Na.

Accordingly, a method of making a black colored dye useful for dyeing textiles comprises diazotizing a 2-amino-4-nitrophenol followed by coupling the diazonium compound to benzaldehyde phenylhydrazone-4-sulfonamide. The product is then converted from the unmetallized formazan compound to a 1:2 Fe-complexed dye using an Fe salt at a pH of about 8 or less. Typically, Fe(II) sulfate is used in the presence of NaOH.

Similarly, a method of making a blue colored dye comprises diazotizing 2-amino-4-chlorophenol, and coupling the diazonium compound with benzaldehyde phenylhydrazone-4-sulfonamide. The resulting unmetallized formazan compound is then converted to the 1:2 Fe-complexed dye using an Fe salt at a pH of about 8 or less using Fe(II) sulfate in the presence of NaOH.

Relatedly, a method of dyeing a textile with a black-colored dye employs an aforementioned 1:2 Fe-complexed formazan dye having formula (II) or (III), wherein X and $X_1$ are O, Y and $Y_1$ are $NO_2$, Z and $Z_1$ are $SO_2NH_2$, and A is Na. The method results in a dyed textile having superior lightfastness comparable to that of a textile dyed at a substantially similar depth with a black 1:2 Cr-complexed azo dye such as Acid Black 172.

Likewise, a method of dyeing a textile with a blue colored dye employs a 1:2 Fe-complexed formazan dye having formula (II) or (III), wherein X and $X_1$=O; Y and $Y_1$=H or Cl; Z and $Z_1$=$SO_2NH2$; and A=Na.

The following examples are illustrative and clarify the present invention, but do not limit it.

EXAMPLES

The chemicals used in synthesizing the present dyes were obtained from Aldrich Chemical Company (Milwaukee, Wis.) or Mobay Chemical Company (Pittsburgh, Pa.), and were used without further purification. The purity of the synthesized dyes was checked by TLC ($BuOH:Pyridine:H_2O$ 2:2:1), using glass-backed silica gel 60 plates from Bodman Chemical Company (Doraville, Ga.). The structure of all dyes was confirmed using $^1H$ NMR (unmetallized dyes) or negative ion FAB spectrometry (unmetallized and metallized dyes). Lightfastness, washfastness and crockfastness were evaluation according to AATCC Test Methods 16-1990, 61-1986 and 8-1985, respectively. In every case the rating scale employed ranged from a low of 1 to a high of 5.

Preparation Example 1.

4-Aminobenzenesulfonamide (52 g, 0.3 mol) was dissolved in 200 ml $H_2O$ containing 30 ml 30% NaOH and added to 75 ml 4N $NaNO_2$. The resulting solution was poured over 100 g crushed ice containing 100 ml 30% HCl at a rate needed to maintain a reaction temperature of 5° C. The diazotization step was carried out for 40 min and the resultant diazonium salt was then added slowly to a stirred solution of 99.95 g $Na_2SO_3$ in 250 ml water at 10° C., and the reaction was continued for 1 h. At this point, the reaction temperature was raised to 70° C. and 300 ml 30% HCl was added over 30 min. The precipitated product was stirred overnight, collected by filtration, washed with cold water and dried. The phenylhydrazine-4-sulfonamide obtained (47 g) was dissolved in 600 ml $H_2O$ containing 40 ml 30% NaOH, and to this solution 27.5 g (0.26 mol) of benzaldehyde was added at 50°–55° C. After stirring for 1 h, the temperature was reduced to 30° C. and 24 ml 30% HCl was added. The precipitated product was collected by filtration, washed with cold water and dried, to give 47.2 g of benzaldehyde phenylhydrazone-4-sulfonamide (m.p. 199° C.).

Preparation Example 2.

Sulfanilic acid (52 g, 0.3 mol) was dissolved in 200 ml $H_2O$ containing 16.5 g $Na_2CO_3$. The resulting solution was cooled to 10° C. and 35 g of conc. $H_2SO_4$ was then added dropwise, followed by the addition of 75 ml 4N $NaNO_2$. The diazotization step was carried out for 15 min at 10°–12° C., then the diazonium salt was collected by filtration, washed with a small amount of cold water and added, at 5° C., to a stirred solution of 85 g of $Na_2SO_3$ in 250 ml $H_2O$. After stirring the reaction mixture for 1 h, the temperature was raised to 95° C. and 240 ml of concentrated $H_2SO_4$ was added over a period of 30 min. The reaction mixture was left overnight and the precipitated product was collected, washed with cold water and dried. The phenylhydrazine-4-sulfonic acid obtained (52 g) was dissolved in 500 ml $H_2O$ containing 60 ml 30% NaOH, and 30 g (0.28 mol) of benzaldehyde was added at 50°–55° C. Stirring was continued for 1 h, the temperature was reduced to 30° C., and the product was precipitated by acidification with 36 ml 30% HCl. The product was collected, washed with a small amount of cold water and dried, to give 50 g of benzaldehyde phenylhydrazone-4-sulfonic acid.

Example 1

Preparation of dye 101

2-Amino-4-chlorophenol (7.175 g, 0.05 mol) is dissolved in 80 mL $H_2O$ containing 10 mL 30% HCl, and after cooling to 0°–5° C. the amine is diazotized with 12.5 mL 4N $NaNO_2$. Diazotization is carried out for 30 min and the resulting diazonium salt solution is added at 0°–5° C. to a solution of 14.75 g (0.054 mol) benzaldehyde phenylhydrazone-4-sulfonamide in 350 mL $H_2O$ containing 25 mL 30% NaOH and 30 mL of pyridine. The coupling reaction is stirred overnight. The unmetallized dye (100) is salted out of solution, using 15% NaCl, to give 24 g of reddish blue product. The metal-free dye is dissolved in 280 mL $H_2O$ containing 4.4 mL 30% NaOH, at 50° C., and metallized using 6.95 g (0.025 mol) $FeSO_4 \cdot 7H_2O$ dissolved in 40 mL $H_2O$. The reaction is stirred for 2 h at 60°–70° C. The target 1:2 Fe complex is salted out of solution using 5% NaCl to give 18.4 g of a dye (101) which dyes wool and nylon in fast blue shades.

Example 2

Preparation of dye 103

2-Amino-4-nitrophenol (7.70 g, 0.05 mol) is dissolved in 75 mL $H_2O$ containing 10 mL 30% HCl and, after cooling to 0°–5° C., is diazotized with the aid of 12.5 mL 4N $NaNO_2$. Diazotization is carried out for 45 min and the diazonium salt solution is added at 0°–5° C. to a solution of 14.75 g (0.054 mol) of benzaldehyde phenylhydrazone-4-sulfonamide in 350 mL $H_2O$ containing 25 mL 30% NaOH and 30 mL pyridine. The coupling reaction is stirred overnight. The unmetallized dye (102) is salted out of solution using 15% NaCl, to give 21.4 g of reddish blue product. The metal-free dye is dissolved in 280 mL $H_2O$ containing 4.4 mL 30% NaOH at 50° C. and metallized using 6.95 g (0.025 mol) $FeSO_4 \cdot 7H_2O$ dissolved in 40 mL $H_2O$. The reaction is stirred for 2 hr at 60°–70° C. The target 1:2 Fe formazan complex is salted out of solution using 5% NaCl, to give 22.5 g of a dye (103) which dyes wool and nylon in fast black shades.

Example 3

Preparation of dye 105

A solution of 5.45 g (0.05 mol) of 2-aminophenol in 350 mL $H_2O$ with 5 mL 30% NaOH and 12.5 mL 4N $NaNO_2$ is poured over 16 g of crushed ice containing 16.6 mL 30% HCl. Diazotization is carried out for 30 min at 0°–5° C. The diazonium salt solution is added dropwise at 0°–5° C. to a solution of 14.75 g (0.054 mol) of benzaldehyde phenylhydrazone-4-sulfonamide in 350 mL $H_2O$ containing 25 mL 30% NaOH and 30 mL pyridine. The coupling reaction is stirred overnight. The unmetallized dye (104) is salted out of solution using 15% NaCl, to give 15.4 g red product. The metal-free dye is dissolved in 225 mL $H_2O$ containing 3.5 mL 30% NaOH, at 50° C., and metallized using 5.54 g (0.02 mol) $FeSO_4 \cdot 7H_2O$ in 35 mL $H_2O$. The reaction is stirred for 2 h at 60°–70° C. The target 1:2 Fe complex is salted out of solution using 5% NaCl, to give 10.8 g of a dye (105) which dyes wool and nylon in fast reddish blue shades.

Example 4

Preparation of dye 107

A solution of 9.90 g (0.05 mol) of 2-amino-4-sulfonamidophenol in 100 mL $H_2O$ containing 6.25 mL 30% NaOH is poured over 75 g crushed ice containing 14.5 mL 30% HCl. To the resulting suspension, 12.5 mL 4N $NaNO_2$ is added at a rate such that the reaction temperature is kept at 0°–5° C. Diazotization is carried out for 1 h and the resulting diazonium salt solution is added dropwise at 0°–5° C. to a solution of 10.59 g (0.054 mol) of benzaldehyde phenylhydrazone in 125 mL $H_2O$ containing 75 mL pyridine and 25 mL 30% NaOH. The coupling reaction is stirred overnight and the unmetallized dye (106) is salted out of solution, using 15% NaCl, to give 11 g of violet product. The metal-free dye is dissolved in 140 mL $H_2O$ with 2.2 mL 30% NaOH and warmed to 50° C. At this temperature, 3.86 g (0.0139 mol) $FeSO_4 \cdot 7H_2O$ dissolved in 20 mL $H_2O$ is added and the metallization step is carried out for 2 h at 60°–70° C. The target 1:2 Fe-complexed dye is salted out of solution using 5% NaCl, to give 9.2 g of a dye (107) which dyes wool and nylon in violet shades.

Example 5

Preparation of dye 109

2-Aminobenzoic acid (6.85 g, 0.05 mol) is dissolved in 75 mL $H_2O$ containing 3 g $Na_2CO_3$ at 40° C. and stirred for 15 min. To this solution 15 mL 30% HCl is added. The reaction mixture is cooled to 0° C. and the amine is diazotized using 12.5 mL 4N $NaNO_2$. Diazotization is carried out for 30 min at 0°–2° C. The diazonium salt solution is added at 0°–5° C. to a solution of 14.75 g (0.054 mol) of benzaldehyde phenylhydrazone-4-sulfonamide in 350 mL $H_2O$ containing 25 mL 30% NaOH and 30 mL pyridine. The coupling reaction is stirred overnight. The unmetallized dye (108) is isolated by the acidification with 40 mL 30% HCl and filtration to give 21.2 g of reddish orange product. The metal-free dye is dissolved at 50° C. in 280 mL $H_2O$ containing 4.4 mL 30% NaOH and reacted with 6.95 g (0.025 mol) $FeSO_4 \cdot 7H_2O$ dissolved in 40 mL $H_2O$. The reaction is stirred for 2 h at 60°–70° C., and the target 1:2 Fe-complexed dye is salted out of solution using 5% NaCl, to give 22.5 g of a dye (109) which dyes wool and nylon in fast brown shades.

Example 6

Preparation of dye 110

A mixture of 10 g (0.025 mol) of dye 106 and 9.85 g (0.025 mol) of dye 104 is dissolved in 275 mL $H_2O$ containing 4.4 mL 30% NaOH at 50° C. and reacted with 6.95 g (0.025 mol) $FeSO_4 \cdot 7H_2O$ dissolved in 40 mL $H_2O$ for 2 h at 60°–70° C. The target 1:2 Fe complex is salted out of solution using 5% NaCl to give 18.65 g of a dye which dyes wool and nylon in violet shades. This product is a statistical mixture of unsymmetrical dye 110 and symmetrical dyes 105 and 107.

Example 7

Preparation of dye 111

A mixture of 10 g (0.025 mol) of dye 106 and 10.75 g (0.025 mol) of dye 100 in 275 mL $H_2O$ containing 4.4 mL 30% NaOH is metallized, using 6.95 g (0.025 mol) $FeSO_4 \cdot 7H_2O$ dissolved in 40 mL $H_2O$, for 2 h at 60°–70° C. The 1:2 Fe complex is salted out of solution using 5% NaCl, to give a dye which dyes wool and nylon in blue shades. The product is a statistical mixture of dye 111 and symmetrical dyes 101 and 107.

Example 8

Preparation of dye 112

A solution of 10.75 g (0.025 mol) of dye 100 and 9.85 g (0.025 mol) of dye 104 in 275 mL $H_2O$ containing 4.4 mL 30% NaOH is metallized using 6.95 g (0.025 mol) $FeSO_4 \cdot 7H_2O$ dissolved in 40 mL $H_2O$, for 2 h at 60°–70° C. The 1:2 Fe complex is isolated by salting it out of solution using 5% NaCl, giving 20 g of a dye which dyes wool and nylon in fast navy shades. The product is a statistical mixture of dye 112 and symmetrical dyes 101 and 105, also formed in this synthesis.

Example 9

Preparation of dye 113

A solution of 11 g (0.025 mol) of dye 102 and 10.75 g (0.025 mol) of dye 100 in 275 mL $H_2O$ containing 4.4 mL 30% NaOH is metallized, using 6.95 g (0.025 mol) $FeSO_4 \cdot 7H_2O$ dissolved in 40 mL $H_2O$, for 2 h at 60°–70° C. The product containing dye 113 and symmetrical dyes 103 and 101 is salted out of solution using 5% NaCl, giving 15.6 g of a dye which dyes wool and nylon in fast black shades.

Example 10

Preparation of dye 114

A solution of 11 g (0.025 mol) dye 102 and 10.58 g (0.025 mol) dye 108 in 275 mL $H_2O$ with 4.4 mL 30% NaOH is metallized, using 6.95 g (0.025 mol) $FeSO_4 \cdot 7H_2O$ dissolved in 40 mL $H_2O$, for 2 h at 60°–70° C. After adding 5% NaCl, 15.6 g of product, containing dye 114 and symmetrical dyes 103 and 109, is obtained which dyes wool and nylon in fast brownish violet shades.

Example 11

Preparation of dye 115

A solution of 10 g (0.025 mol) of dye 106 and 10.58 g (0.025 mol) of dye 108 in 275 mL $H_2O$ containing 4.4 mL 30% NaOH is metallized, using 6.95 g (0.025 mol) $FeSO_4 \cdot 7H_2O$ dissolved in 40 mL $H_2O$, for 2 h at 60°–70° C. After salting out of solution with 5% NaCl, 19 g of the product, containing dye 115 and symmetrical dyes 107 and 109, is obtained which dyes wool and nylon in fast brownish violet shades.

Example 12

Preparation of dye 117

Diazotization of 2-amino-4-chlorophenol is carried out in the manner described in Example 1 and the resulting diazonium compound is coupled to benzaldehyde phenylhydrazone-4-sulfonic acid dissolved in 300 mL $H_2O$ containing 25 mL 30% NaOH and 30 mL pyridine. The unmetallized dye (116) is salted out of solution using 15% NaCl, giving 19.8 g of dye which is metallized and isolated as described in previous examples, giving 17.5 g of dye 117, which dyes wool and nylon in fast blue shades.

Example 13

Preparation of dye 118

Using the procedure outlined in Example 2 for diazotizing 2-amino-4-nitrophenol, and Example 12 for coupling the diazo product to benzaldehyde phenylhydrazone-4-sulfonic acid, an unmetallized dye is prepared. The unmetallized dye is then salted out and metallized as described in Example 12 to give 20 g of dye 118 which dyes wool and nylon in fast black shades.

Example 14

Preparation of dye 119

Using the procedure outlined in Example 5 for diazotizing 2-aminobenzoic acid, and Example 12 for coupling the diazo product to benzaldehyde phenylhydrazone-4-sulfonic acid, an unmetallized dye is prepared. The unmetallized dye is then salted out and metallized as described in Example 12 to give 22.5 g of dye 119 which dyes wool and nylon in fast brown shades.

Example 15

Preparation of dye 120

The unmetallized dyes prepared as described in Examples 12 and 13 were combined, metallized and salted out as described in Example 9. A 0.025 mol scale reaction gave 16.5 g of product containing a statistical mixture of dye 120 and symmetrical dyes 117 and 118. This colorant dyes wool and nylon in fast black shades.

The formulas of the various compounds described above are summarized in Table 1 with reference to formula (III) hereinabove.

TABLE 1

| Dye* | X | $X_1$ | Y | $Y_1$ | Z | $Z_1$ |
|---|---|---|---|---|---|---|
| 101 | O | O | Cl | Cl | $SO_2NH_2$ | $SO_2NH_2$ |
| 103 | O | O | $NO_2$ | $NO_2$ | $SO_2NH_2$ | $SO_2NH_2$ |
| 105 | O | O | H | H | $SO_2NH_2$ | $SO_2NH_2$ |
| 107 | O | O | $SO_2NH_2$ | $SO_2NH_2$ | H | H |
| 109 | COO | COO | H | H | $SO_2NH_2$ | $SO_2NH_2$ |
| 110 | O | O | $SO_2NH_2$ | H | H | $SO_2NH_2$ |
| 111 | O | O | $SO_2NH_2$ | Cl | H | $SO_2NH_2$ |

TABLE 1-continued

| Dye* | X | $X_1$ | Y | $Y_1$ | Z | $Z_1$ |
|---|---|---|---|---|---|---|
| 112 | O | O | H | Cl | $SO_2NH_2$ | $SO_2NH_2$ |
| 113 | O | O | $NO_2$ | Cl | $SO_2NH_2$ | $SO_2NH_2$ |
| 114 | O | COO | $NO_2$ | H | $SO_2NH_2$ | $SO_2NH_2$ |
| 115 | O | COO | $SO_2NH_2$ | H | H | $SO_2NH_2$ |
| 117 | O | O | Cl | Cl | $SO_3Na$ | $SO_3Na$ |
| 118 | O | O | $NO_2$ | $NO_2$ | $SO_3Na$ | $SO_3Na$ |
| 119 | COO | COO | H | H | $SO_3Na$ | $SO_3Na$ |
| 120 | O | O | $NO_2$ | Cl | $SO_3Na$ | $SO_3Na$ |

*Dyes 110–115 and 120 are statistical mixtures of unsymmetrical and symmetrical molecules.

Example 16

Evaluation of Dyed Textiles

The Fe-complexed formazan dyes of the present invention and two widely used commercial Cr-complexed dyes, C.I. Acid Black 52 (AB52) and C.I. Acid Black 172 (AB172), were applied individually to textile fabrics. The colors of the dyed textiles at different shade depths are listed in Table 2.

TABLE 2

Typical Colors of Dyed Textiles (Wool and Nylon) Produced by Dyes of the Invention

| Dye | Shade Depth (%) | Fabric Color |
|---|---|---|
| 101 | 2 | Blue |
| 103 | 2 | Reddish-Black |
| 103 | 6 | Black |
| 105 | 2 | Reddish-Blue |
| 107 | 2 | Reddish-Violet |
| 109 | 2 | Brown |
| 110 | 2 | Violet |
| 111 | 2 | Bluish-Violet |
| 112 | 2 | Blue |
| 113 | 2 | Brownish-Black |
| 113 | 6 | Black |
| 114 | 2 | Brownish-Violet |
| 115 | 2 | Brownish-Violet |
| 117 | 2 | Violet |
| 118 | 2 | Violet |
| 118 | 6 | Black |
| 119 | 2 | Brown |
| 120 | 2 | Reddish-Violet |
| 120 | 6 | Black |
| AB52* | 2 | Gray |
| AB52* | 6 | Black |
| AB172* | 2 | Gray |
| AB172* | 6 | Black |

*Commercial dye C.I. Acid Black 52 was obtained from Aldrich Chemicals (Milwaukee, WI). C.I. Acid Black 172 was synthesized according to the method described in Sokolowska-Gajda et al., Textile Res. J., 64(7): 388–396 (1994).

Application to Wool.

The fabric was dyed at 100° C. for 45 minutes using an Ahiba Texomat dyeing machine in a dyebath containing 2% or 6% dye and 4% $(NH_4)_2SO_4$, based on the fabric weight, and a liquor ratio of 40:1. The resulting fabrics were rinsed in warm water, rinsed in cold water, and air-dried.

Application of Dyes to Nylon.

The fabric was dyed at 100° C. for 1 hour using an Ahiba Texomat dyeing machine in a dyebath containing 2% or 6% dye and 3% $NH_4OAc$, based on the fabric weight, and a liquor ratio of 40:1. The resulting fabrics were rinsed in warm water, rinsed in cold water, and air-dried.

Fastness Properties.

Results from the evaluation of fastness to light, washing, and rubbing for wool and nylon dyed with the dyes of this invention are summarized in Table 3. All of the dyes gave high washfastness and crockfastness, and only one dye (110) gave an unacceptable lightfastness (rating <3) at the lower exposure level.

Also, as seen in Table 4, the lightfastness of the fabrics dyed in black using the Fe-complexed formazan dyes 103 and 113 was compared to the lighfastness of fabric dyed with the prototype commercial black Cr-complexed azo dyes recommended for applications requiring high photostability, i.e., Acid Black 52 and Acid Black 172. It can be seen that the lightfastness of fabric dyed with the present Fe formazan dyes have better lightfastness, particularly on nylon at high levels of exposure, e.g., 451 $kJ/m^2$. Since dyes 103 and 113 give lightfast black shades, they can be used as environmentally safe alternatives to commercial black dyes for nylon and wool, which contain a metal designated as a priority pollutant.

TABLE 3

Fastness Properties of Dyes 101–120.

| | | Lightfastness[a,c] | | | | Washfastness[b] | | | | | | |
|---|---|---|---|---|---|---|---|---|---|---|---|---|
| | | | | | | Color change | | Fiber staining | | | | Crockfastness[b] |
| | Depth of shade | Wool | | Nylon | | | | Dyed wool | | Dyed nylon | | |
| Dye | (%) | 40 h | 80 h | 40 h | 80 h | Wool | Nylon | A | B | A | B | Wool | Nylon |
| 101 | 2 | 3–4 | 3 | 4–5 | 4 | 5 | 5 | 5 | 4–5 | 5 | 4–5 | 5 | 5 |
| 103 | 2 | 5 | 4–5 | 4–5 | 3–4 | 5 | 5 | 5 | 4 | 5 | 4–5 | 5 | 5 |
| 103 | 6 | 4–5 | 4–5 | 4–5 | 4–5 | 5 | 5 | 5 | 4 | 5 | 4–5 | 4–5 | 4–5 |
| 105 | 2 | 4–5 | 4–5 | 4–5 | 4 | 5 | 5 | 5 | 5 | 5 | 4–5 | 5 | 5 |
| 107 | 2 | 2–3 | 2 | 3–4 | 2 | 5 | 5 | 4–5 | 4 | 4–5 | 4 | 4–5 | 5 |
| 109 | 2 | 4 | 3–4 | 4–5 | 4 | 5 | 5 | 4–5 | 4 | 4–5 | 4–5 | 5 | 5 |
| 110 | 2 | 2 | 1 | 1–2 | <1 | 5 | 5 | 5 | 4–5 | 5 | 4–5 | 4–5 | 4–5 |
| 111 | 2 | 3 | 2 | 3–4 | 2 | 5 | 5 | 5 | 4 | 4–5 | 4–5 | 5 | 5 |
| 112 | 2 | 3 | 2 | 4 | 3 | 5 | 5 | 5 | 4–5 | 5 | 4–5 | 5 | 5 |

TABLE 3-continued

Fastness Properties of Dyes 101–120.

| Dye | Depth of shade (%) | Lightfastness[a,c] Wool 40 h | Wool 80 h | Nylon 40 h | Nylon 80 h | Washfastness[b] Color change Wool | Nylon | Fiber staining Dyed wool A | B | Dyed nylon A | B | Crockfastness[b] Wool | Nylon |
|---|---|---|---|---|---|---|---|---|---|---|---|---|---|
| 113 | 2 | 4–5 | 4–5 | 4–5 | 4 | 5 | 5 | 4–5 | 4 | 4–5 | 4–5 | 5 | 5 |
| 113 | 6 | 5 | 5 | 4–5 | 4–5 | 5 | 5 | 4–5 | 4 | 4–5 | 4 | 4–5 | 5 |
| 114 | 2 | 5 | 4 | 4 | 3 | 5 | 5 | 5 | 4–5 | 4–5 | 4–5 | 5 | 5 |
| 115 | 2 | 4 | 2–3 | 3–4 | 2–3 | 5 | 5 | 4–5 | 4–5 | 5 | 4–5 | 5 | 5 |
| 117 | 2 | 2–3 | 1–2 | 3 | 2 | 5 | 5 | 4 | 4 | 4 | 4 | 5 | 5 |
| 118 | 2 | 3–4 | 3–4 | 3 | 2 | 4 | 4 | 4 | 4 | 4 | 4 | 5 | 5 |
| 118 | 6 | 4–5 | 4–5 | 4 | 2–3 | 4 | 4 | 4 | 4 | 4 | 4 | 5 | 5 |
| 119 | 2 | 4–5 | 4 | 3–4 | 3 | 4 | 4 | 3–4 | 3–4 | 4 | 4–5 | 5 | 5 |
| 120 | 2 | 3–4 | 2–3 | 3–4 | 2–3 | 4–5 | 4–5 | 4–5 | 4–5 | 4–5 | 5 | 5 | 5 |
| 120 | 6 | 4–5 | 4 | 3–4 | 2–3 | 4–5 | 4–5 | 4–5 | 4–5 | 4–5 | 4 | 5 | 5 |

[a]Lightfastness was evaluated using ATLAS ES 25 weather-ometer according to AATCC Test Method 16-1990 for textile materials.
[b]Washfastness and crockfastness were evaluated according to AATCC Test Method 61-1986 (Test No. 2) and Test Method 8-1985, respectively.
[c]Scale ranges from a low of 1 and high of 5, with values <3 being unacceptable.
A — staining of wool
B — staining of nylon

TABLE 4

Lightfastness of Black Dyes Using the GM Test for Automotives.[a]

| Dye | Depth of shade % | Lightfastness[b] Wool 225.6 kJ/m² | Wool 451.2 kJ/m² | Nylon 225.6 kJ/m² | Nylon 451.2 kJ/m² |
|---|---|---|---|---|---|
| 103 | 2 | 3 | 2 | 1–2 | 1 |
|  | 6 | 5 | 4–5 | 4–5 | 3 |
| 113 | 2 | 3–4 | 2 | 1 | 1 |
|  | 6 | 4–5 | 4 | 4–5 | 3–4 |
| Acid Black 52 | 2 | 3–4 | 2–3 | 4 | 2 |
|  | 6 | 4–5 | 3–4 | 4 | 2 |
| Acid Black 172 | 2 | 2 | 1 | 1–2 | 1–2 |
|  | 6 | 4 | 4 | <1 | <1 |

[a]Lightfastness was evaluated using General Motors Corporation (GM) test method.
[b]Scale ranges from a low of 1 to a high of 5, with values <3 being unacceptable.

Conclusion

As described above, 1:2 Fe-complexed formazan dyes can be prepared, which have good affinity for protein and polyamide fibers. These dyes expand the spectrum of colors from that traditionally reported for Fe complexes to include examples of violet and blue colors. It has been shown that the black Fe-complexed formazan dyes of the invention compare favorably with commercially used acid black dyes in terms of their fastness properties. Significantly, the instant dyes provide a potential solution to environmental problems associated with the synthesis and application of Cr- and Co-based metallized acid dyes.

The foregoing detailed examples have been presented only for purposes of illustration and clarity, and it is apparent that certain obvious modifications can be practiced within the scope of the invention as defined by the appended claims.

What is claimed is:

1. A dye of the formula

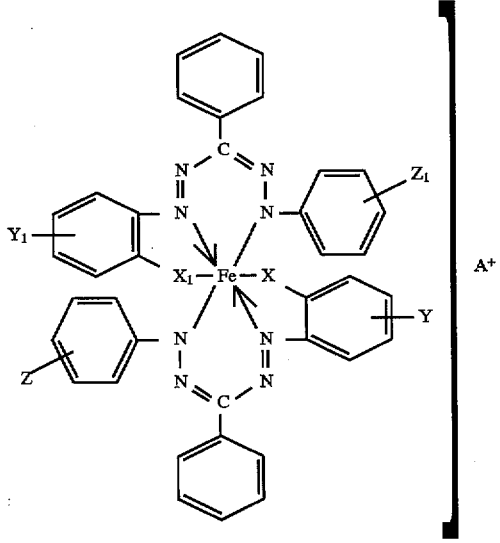

wherein

X and $X_1$ are independently O or COO;

Y and $Y_1$ are independently H, halogen, $NO_2$, $SO_2NH_2$, $SO_2N(R_1)_2$, $SO_2NH(R_1)$, or $SO_2(R_1)_2$, where $R_1$ is $C_1$–$C_6$ alkyl, $C_1$–$C_6$ hydroxyalkyl, or $C_1$–$C_6$ alkoxyalkyl;

Z and $Z_1$ are independently H, $SO_2NH_2$, $SO_2N(R_1)_2$, $SO_2NH(R_1)$, or $SO_2(R_1)_2$ wherein $R_1$ is $C_1$–$C_6$ alkyl, $C_1$–$C_6$ hydroxyalkyl, or $C_1$–$C_6$ alkoxyalkyl, or $R_1$ is $SO_3M$ wherein M is $H^+$, a metal ion, or $NH_4^+$; and $A^+$ is $H^+$, a metal ion, or $NH_4^+$.

2. A dye according to claim 1 which is environmentally friendly and has a lightfastness comparable to that of a Cr-based acid black dye.

3. A dye according to claim 1 which is blue, violet or reddish-violet.

4. A dye of the formula:

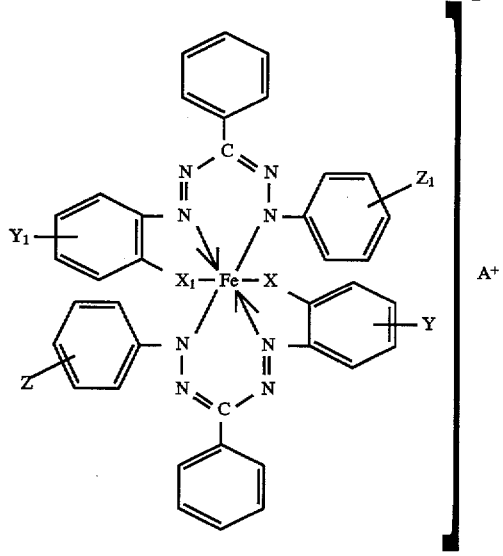

wherein X and $X_1$ are independently O or COO,
Y and $Y_1$ are independently H, halogen, $NO_2$, or $SO_2NH_2$,
Z and $Z_1$ are independently H, $SO_2NH_2$, or $SO_3M$,
wherein M is $H^+$, a metal ion, or $NH_4^+$, and
$A^+$ is $H^+$, $Na^+$, $K^+$, $Li^+$, or $NH_4^+$.

5. A dye as in claim 4, wherein the 1:2 Fe formazan compound has the formula:

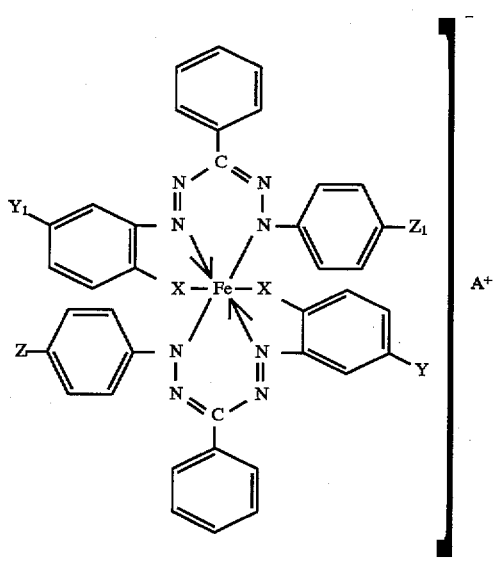

and X, $X_1$, Y, $Y_1$, Z, $Z_1$ and $A^+$ have the same meanings.

6. A dye as in claim 4, wherein the halogen is Cl.

7. A dye as in claim 4, wherein $A^+$ and M are both metal ions.

8. A dye as in claim 7, wherein said metal ions are $Na^+$ ions.

9. A dye as in claim 5 wherein X and $X_1$ are O, Y and $Y_1$ are $NO_2$ and Z and $Z_1$ are $SO_2NH_2$.

10. A method of making a 1:2 Fe-complexed formazan dye comprising:

diazotizing a 2-aminophenol or 2-aminobenzoic acid compound;

coupling the diazo product with a benzaldehyde phenyl-hydrazone of the formula

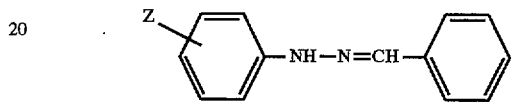

wherein Z is selected from the group consisting of H, $SO_2NH_2$, $SO_2N(R_1)_2$, $SO_2NH(R_1)$, $SO_2(R_1)_2$, and $SO_3M$, where $R_1$ is $C_1$–$C_6$ alkyl, $C_1$–$C_6$ hydroxyalkyl, or $C_1$–$C_6$ alkoxyalkyl, and M is $H^+$, a metal ion, or $NH_4^+$, thereby forming an unmetallized formazan;

reacting the unmetallized formazan with an Fe salt in aqueous solution at a pH of about 8 or less to generate a 1:2 Fe-complexed formazan; and precipitating the 1:2 Fe-complexed formazan.

11. A method as in claim 10, wherein the 2-aminophenol or 2-aminobenzoic acid compound has the formula

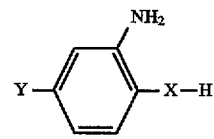

wherein X is O or COO, and Y is H, halogen, $NO_2$, or $SO_2NH_2$.

12. A method as in claim 10, wherein the Fe salt is selected from the group consisting of iron sulfates, iron nitrates, iron halides, iron formates, iron acetates, and combinations thereof.

* * * * *